(12) United States Patent
Liau et al.

(10) Patent No.: US 8,675,268 B2
(45) Date of Patent: Mar. 18, 2014

(54) EIT-BASED PHOTONIC LOGIC GATE

(75) Inventors: Teh-Chau Liau, Hsinchu County (TW); Jian-Qi Shen, Zhejiang (CN); Jin-Jei Wu, Tainan (TW); Tzong-Jer Yang, Hsinchu (TW)

(73) Assignee: Chung-Hua University, Hsinchu (TW)

( * ) Notice: Subject to any disclaimer, the term of this patent is extended or adjusted under 35 U.S.C. 154(b) by 71 days.

(21) Appl. No.: 13/421,461

(22) Filed: Mar. 15, 2012

(65) Prior Publication Data

US 2013/0016411 A1    Jan. 17, 2013

(30) Foreign Application Priority Data

Jul. 14, 2011 (TW) .............................. 100125014 A

(51) Int. Cl.
*G06E 3/00* (2006.01)
*G02F 3/00* (2006.01)

(52) U.S. Cl.
USPC .......................................... 359/107; 359/108

(58) Field of Classification Search
USPC ................................................ 359/107, 108
See application file for complete search history.

(56) References Cited

U.S. PATENT DOCUMENTS 7,031,585 B2    4/2006    Soljacic et al.

OTHER PUBLICATIONS

Erik Forsberg et al., Tunable Photonic Crystals Based on EIT media, Proc. Of. SPIE, (2006), vol. 6352, pp. 63520S-1-63520S-9.
Suguru Sangu et al., Logic and functional operations using a near-field optically coupled quantum-dot system, Physical Review B, Mar. 26, 2004, pp. 115334-1-115334-13, vol. 69, The American Physical Society.
Tadashi Kawazoe et al., Demonstration of a nanophotonic switching operation by optical near-field energy transfer, Applied Physics Letters, May 5, 2003, pp. 2957-2959, vol. 82 No. 18, American Institute of Physics.

*Primary Examiner* — Jade R Chwasz
(74) *Attorney, Agent, or Firm* — Muncy, Geissler, Olds & Lowe, P.C.

(57) ABSTRACT

An electromagnetically induced transparent (EIT)-based photonic logic gate. The electromagnetically induced transparent (EIT)-based photonic logic gate is a photonic crystal (PC) and electromagnetically induced transparent (EIT)-based stacked layer which is constituted by a photonic crystal (PCs) layers and an electromagnetically induced transparent material layers. For the photonic crystal (PCs) and electromagnetically induced transparent (EIT)-based stacked layer, a probe field is an input signal which is emitted from the photonic crystal layer and a control field is a control signal which is emitted from the electromagnetically induced transparent material layers. The probe field is an input signal which is emitted from the electromagnetically induced transparent material layers. By varying the detune frequency of probe field and Rabi frequency of control field, the band gap structure can be adjusted. Henceforth, the tunable optical electromagnetically induced transparent (EIT)-based photonic logic gate can be achieved.

9 Claims, 19 Drawing Sheets

EIT-BASED PHOTONIC LOGIC GATE

BACKGROUND OF THE INVENTION

1. Technical Field

The present invention relates to photonic logic gates, and more particularly, to an EIT-based photonic logic gate that is tunable in bandwidth.

2. Description of Related Art

Photonic crystals are artificial periodic structures with photonic band gaps, and work by interacting with light. A photonic band gap of a periodic structure refers to a certain frequency range and any waves in the frequency range are not allowed to propagate in the periodic structure. The presence of band gaps promises photonic crystals prospects of extensive applications, because larger band gaps mean a broader band of adjustable light. When a photonic crystal is finished, its band-gap structure is fixed and its refractive index becomes unchangeable. Thus, when a different refractive index is needed, the only way is to make another photonic crystal with the desired refractive index.

While photonic logic gates have been discussed in some researches as recited below, one with a tunable band is still unknown.

As disclosed in E. Forsberg, J. She, Optoelectronic Materials and Devices (edited by Y. H. Lee, F. Koyama and Y. Luo, 2006), Proc. of SPIE 6352 (2006), 63520S, a lump of material incorporating therein with a piece of circular dielectric material that contained gaseous EIT (electromagnetically induced transparency) was set in the air for the purposes of research on potential approaches to materials with negative refractive indexes.

In S. Sangu, K. Kobayashi, A. Shojiguchi and M. Ohtsu, Phys. Rev. B 69 (2004) 115334, the study was directed to the probability of a CuCl-based material among 3 quantum dots being close to a light field, and use of the material after properly configured as an optical AND gate or XOR gate.

On the other hand, a CuCl-based material in 3 quantasomes (with a particle size ratio thereof being 1:2^1/2:2) was placed in a NaCl-material array for investigating into the transfer of near-field energy, as described in T. Kawazoe, K. Kobayashi, S. Sangu and M. Ohtsu, Appl. Phys. Lett. 82 (2003), 2957. The paper also proposed the use of the material in a nanoscale photonic switch.

In view of this, how to modify the internal geometric configuration of photonic crystals so as to change the external optical properties and in turn adjust photonic crystals in band would be an issue for the industry to address.

SUMMARY OF THE INVENTION

For remedying the shortcomings of the prior art, the present invention provides an EIT-based photonic logic gate that includes at least N EIT-based stack layers periodically arranged. Each of the EIT-based stack layers has a photonic crystal layer and an EIT material layer. The photonic crystal layer is made of a material having a positive, zero or negative refractive index, and the photonic crystal layer has binding interfaces. The EIT material layer is made of hydrogen, lithium, sodium, rubidium or cesium, and has binding interfaces. The EIT material layer and the photonic crystal layer are bound mutually at the binding interfaces. The EIT-based stack layers use a probe field incident on the photonic crystal layer as an input probe signal, and uses a control field incident on the EIT material layer as an enable signal. The probe field can thus come out from the last EIT material layer, thereby finishing the signal output of the probe field.

Therefore, the primary objective of the present invention is to provide an EIT-based photonic logic gate, wherein EIT-based stack layers thereof can be adjusted in bandwidth (including the band-pass width, the band-gap width, and the band-gap band-pass interlacing width) can be adjusted by changing EIT material layer in atom density and thickness, changing the probe field in detune frequency, and changing the control field in Rabi frequency.

BRIEF DESCRIPTION OF THE DRAWINGS

The invention as well as a preferred mode of use, further objectives and advantages thereof will be best understood by reference to the following detailed description of illustrative embodiments when read in conjunction with the accompanying drawings, wherein.

DETAILED DESCRIPTION OF THE INVENTION

While the present invention discloses an EIT-based photonic logic gate, the principles of photonic crystals and electromagnetically induced transparency used therein have been known to people skilled in the art, so are not given in detail in the following description. Meantime, the accompanying drawings to be read in conjunction with the description are intended to structurally express the features of the present invention, so are not and do not need to be made to scale.

Figure 1A:
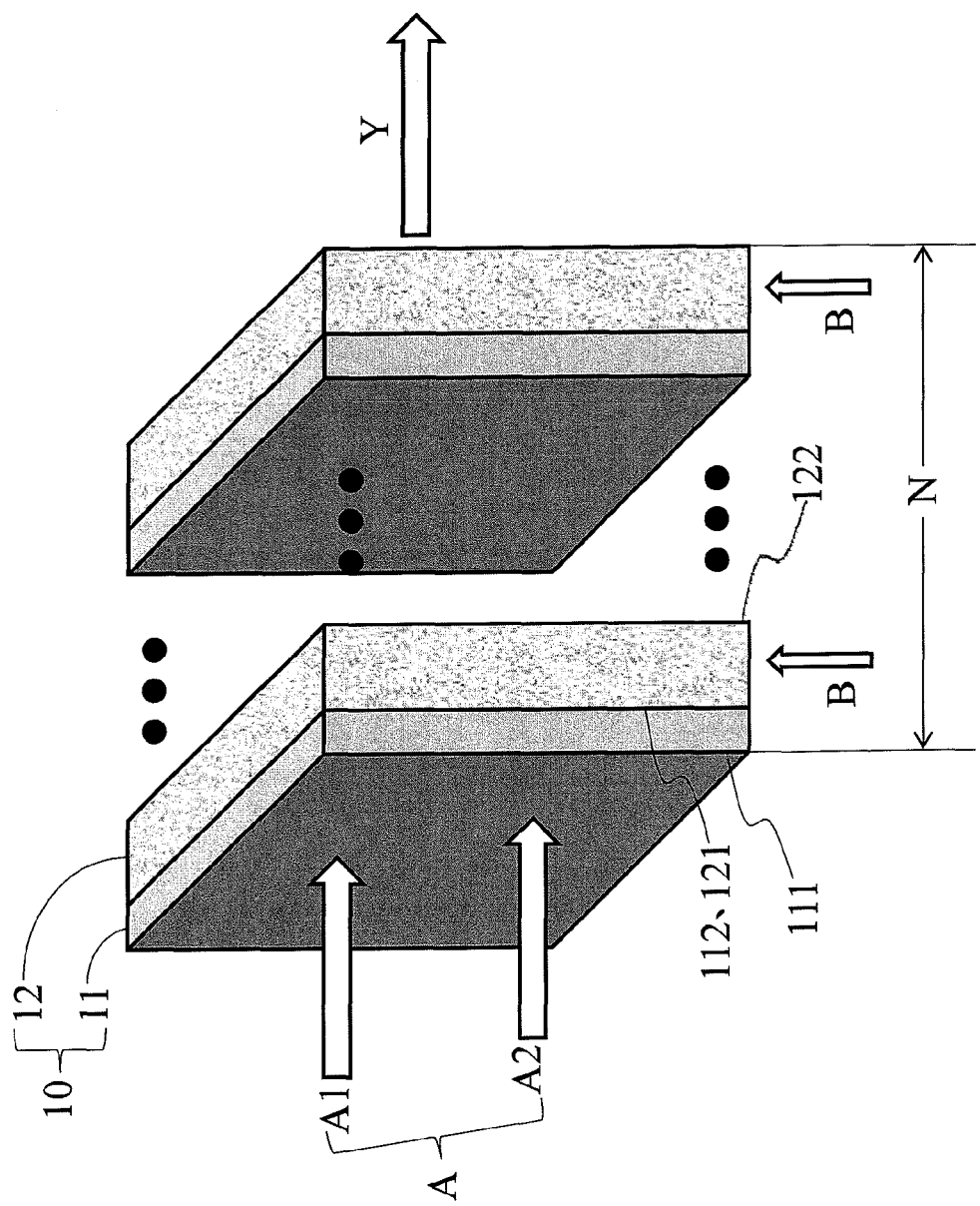
FIG. 1A is a schematic drawing according to one preferred embodiment of the present invention illustrating EIT-based stack layers arranged in a limited period to which a probe field and a control field are applied.

Referring to FIG. 1A, in a first preferred embodiment of the present invention, a structure with EIT-based stack layers arranged in a limited period is shown. The EIT-based photonic logic gate comprises at least N (N is greater than or equal to 1) EIT-based stack layers 10 periodically arranged. Each of the EIT-based stack layers 10 has a photonic crystal layer 11 as thick as 0.01 μm~0.15 μm and an EIT material layer 12 as thick as 0.01 μm~0.15 μm.

The photonic crystal layer 11 may be made of GaAs, $SiO_2$ or glass, which has a positive refractive index and can be derived from nature, or may be made of an artificial metamaterial of nano scale, which may be a combination of materials of positive, zero or negative refractive indexes, such as periodically arranged metal strips and a split-ring resonator (SRR) formed by periodically arranged rings. The rectangular photonic crystal layer 11 has two opposite surfaces defined herein as a first binding interface 111 and a second binding interface 112, respectively, for its binding with the electromagnetic induced transparent 12.

The EIT (Electromagnetically Induced Transparency) material layer 12 is made of a monovalent alkaline metal selected from I-A group, such as hydrogen, lithium, sodium (Na), rubidium (Rb) and cesium (Cs). Since the EIT material layer 12 is made from an atomic gas, the atomic gas has to be contained in a container that is transparent to laser, and does not affect the progress of laser. Thus, glass is an ideal material for such a container. The EIT material layer 12, corresponding to the photonic crystal layer 11, is also rectangular, and also has its opposite surfaces defined as a first binding interface 121 and second binding interface 122. The photonic crystal layer 11 and the EIT material layer 12 are bound to each other with the facing second and first binding interfaces 112, 121, so as to construct an EIT-based stack layer 10. Binding between the layers can be achieved by a high-temperature adhesive or laminating process. Generally, the adhesive or laminating process is performed at 300° K~500° K.

Still referring to FIG. 1A, the EIT-based stack layers 10 made of the photonic crystal layers 11 and the EIT material layers 12 receive a probe field A and a control field B, for changing the bandwidth of the photonic crystal layer 11 and the electric permittivity of the EIT material layer 12.

For applying the fields, more than one beam of the probe field A is prepared. In the present preferred embodiment, two beams of the probe field A with different frequencies are used and denoted by A1 and A2, respectively. A beam of the control field B is also used. The probe field A and the control field B are both lasers at resonance frequency. The probe field A must has its luminous intensity far smaller than that of the control field B. Preferably, the luminous intensity of the control field B is 10 to 200 times as much as the luminous intensity of the probe field A.

Then the probe field A is casted into the first binding interface 111 of the photonic crystal layer 11 as the input probe signal, which passes through the second binding interface 112 of the photonic crystal layer 11 and the first binding interface 121 of the EIT material layer 12, and goes through the photonic crystal layers and the EIT material layers of the N EIT-based stack layers 10 successively, before coming out from the second binding interface 122 of the Nth EIT-based stack layer 10 as the output signal Y. Meantime, the control field B is casted into the EIT material layer 12 as the enable signal. In the EIT material layer 12, the probe field A is not absorbed by a medium, so the medium is transparent to the probe field A. Such transparency is caused by the two-photon resonance put of the control field B.

As to resonance laser, external parameters such as the wavelength, the luminous intensity, the detune frequency and the de-phased rate have to be controlled because they influence the photonic crystal layer 11 (in, for example, bandwidth, including the width of the band-pass structure, the width of the band-gap structure, and the width of the band-gap band-pass interlacing structure) and the EIT material layer 12 (in, for example, electric permittivity). Therefore, in the present preferred embodiment, the probe field A and the control field B are such selected that their parameters are as below. The probe field A has a wavelength between 380 nm and 800 nm, a luminous intensity between 1 cd and 10 cd, and a detune frequency between $-10^8$ s$^{-1}$ and $+10^8$ s$^{-1}$, while the control field B has wavelength between 380 nm and 800 nm, a luminous intensity between 50 cd and 200 cd, and a de-phased rate between $-10^5$ s$^{-1}$ and $+10^5$ s$^{-1}$.

Figure 1B:
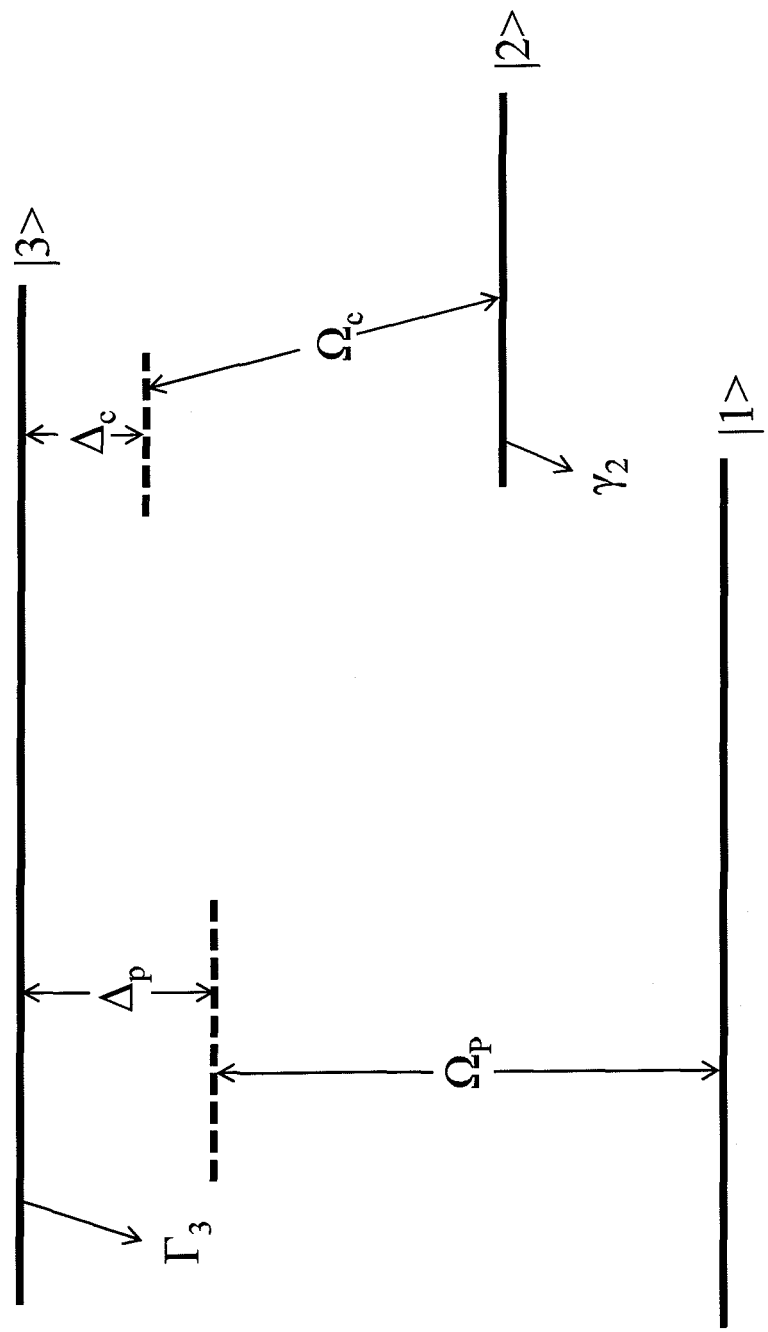
FIG. 1B is a schematic drawing according to one preferred embodiment of the present invention showing a Lambda-type structure of the EIT's atomic energy levels.

Now referring to FIG. 1B, it shows a Gamma-type structure of the EIT's atomic energy levels. The EIT material layer 12 is a three-energy-level system having a first energy level |1>, a second energy level |2> and a third energy level |3>. Generally, the first energy level |1> and the second energy level |2> act as ground-state energy levels, and the third energy level |3> acts as an excited-state energy level. The third energy level |3> has a radiative natural decay rate $\Gamma_3$, while the second energy level |2> has a different non-radiative decay rate $\gamma_2$.

After repeated tests, the atomic and optical parameters selected for the present preferred embodiment are as below. The EIT-based stack layer 10 has an atomic number density between $10^9$ m$^{-3}$ and $10^{23}$ m$^{-3}$, an electrical dipole moment between $10^{-28}$ C·m and $10^{-30}$ C·m, a spontaneous emission decay rate between $0.1 \times 10^7$ s$^{-1}$ and $5 \times 10^7$ s$^{-1}$, and a Rabi frequency $\Omega c$ between $0.5 \times 10^7$ s$^{-1}$ and $5 \times 10^7$ s$^{-1}$. The disclosed parameters are subject to practical needs in manufacturing. The parameters will be further discussed below.

The atomic number density and the electrical dipole moment are respectively in direct proportion to the polarization coefficient, and the entire electric permittivity is equal to 1+the polarization coefficient. When transiting from the first energy level |1> or the second energy level |2> to the third energy level |3>, electrons form an electrical dipole, with the electrically positive properties in the atomic nucleus. The foregoing electrical dipole moment is one of the parameters of electrical dipole, and makes charged particles aggregate at the surface of substance. This phenomenon is known as polarization, and the level of polarization per unit volume is the polarization coefficient.

The foregoing spontaneous emission decay rate $\Gamma_3$ does not vary with any parameters because it represents an estimated probability of natural radiation for the electrons of the third energy level |3> transiting to the first energy level |1>. Once the material is selected, and the distance between the third energy level |3> and the first energy level |1> is fixed, the spontaneous emission decay rate $\Gamma_3$ is maintained at $0.1\times10^7$ s$^{-1}$~$5\times10^7$ s$^{-1}$. Spontaneous emission decay rate $\Gamma_3=2\times10^7$ s$^{-1}$ is one of the possible fixed values, so this value is taken as the benchmark for frequency.

The different non-radiative decay rate $\gamma_2$ does not vary with any parameters because it represents an estimated probability of natural radiation for the electrons of second energy level |2> transiting to the first energy level |1>. Once the material is selected, and the distance between the second energy level |2> and the first energy level |1> is fixed, the non-radiative decay rate $\gamma_2$ is maintained at $10^4$ s$^{-1}$~$5\times10^5$ s$^{-1}$. Non-radiative decay rate $\gamma_2=10^5$ s$^{-1}$ is one of the possible fixed values, approximately equal to 1/20~1/500 of the spontaneous emission decay rate $\Gamma_3$.

The Rabi frequency $\Omega_c$ of the control field B and the Rabi frequency $\Omega_p$ of the probe field A represent fixed parameters for the electrons of the third energy level |3> transiting to the second energy level |2>, and for the electrons of the third energy level |3> transiting to the first energy level |1>, respectively. Once the materials are selected, the Rabi frequency $\Omega_c$ of the control field B and the Rabi frequency $\Omega_p$ of the probe field A are fixed. The detune frequency $\Delta_c$ of the control field B and the detune frequency $\Delta_p$ of the probe field A represent a value obtained by subtracting a frequency difference between the third energy level |3> and the first energy level |2> from the control field's frequency, and a value obtained by subtracting a frequency difference between the third energy level |3> and the first energy level |1> from the probe field's frequency.

Some examples will be given below to further explain the features of the present invention. FIG. 1A is a structure with said EIT-based stack layers 10 arranged in a limited period.

Through the numerical analysis conducted to the EIT-based stack layers 10, it is proven that changing the detune frequency $\Delta_p$ of the probe field A and changing the Rabi frequency $\Omega_c$ of the control field B can bring about significant change to the relative electric permittivity, Bloch wave number, reflection coefficient and reflectance. The following explanation will be clear when read in conjunction with the particular drawings.

Figure 2A:
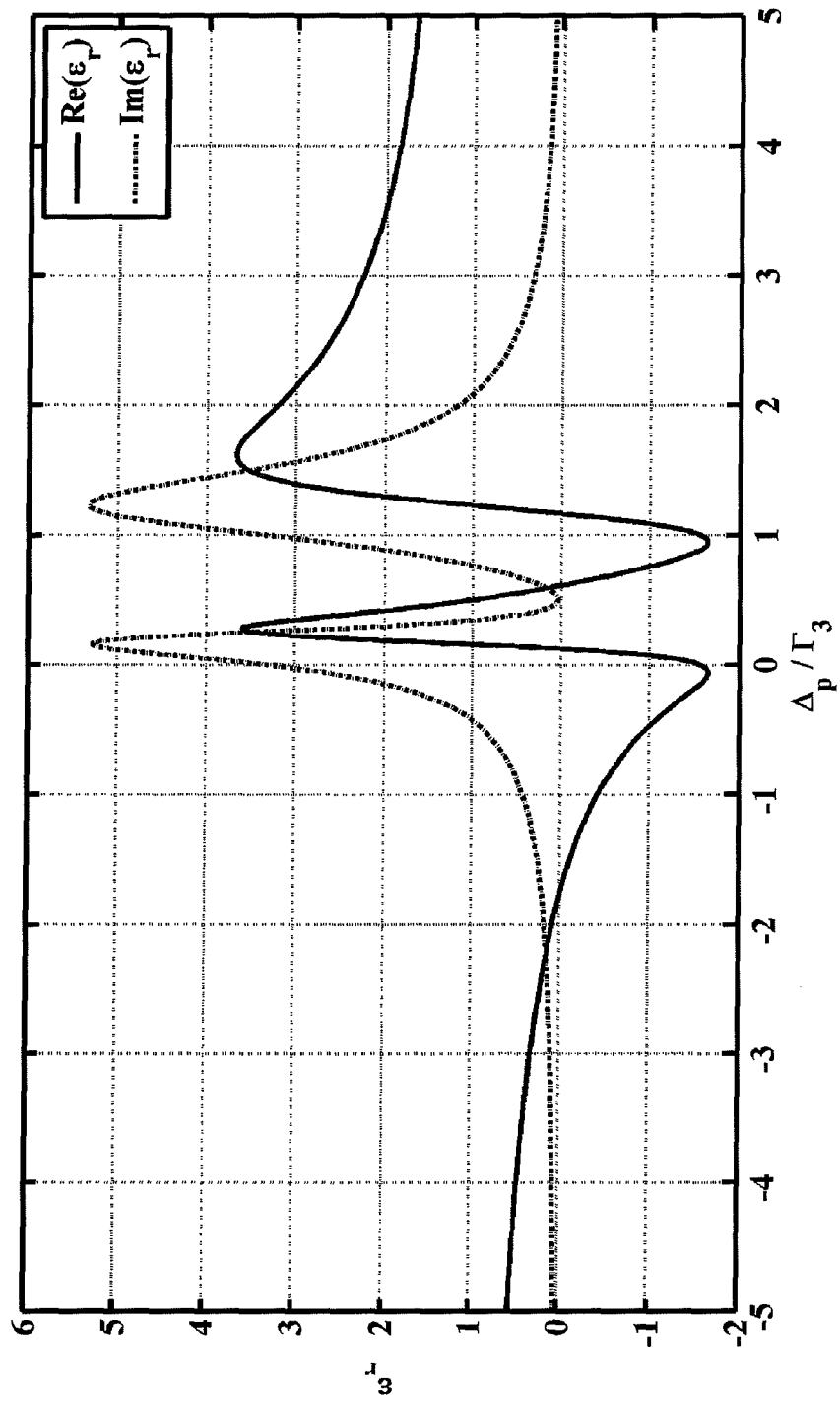
FIG. 2A is a graph of the relative electric permittivity of one preferred example of the present invention versus the detune frequency.

FIG. 2A is a graphic of the relative electric permittivity versus the detune frequency. The relative electric permittivity refers to the permittivity of the EIT-based stack layers 10 with limited layers relative to the electric permittivity of free space, and the standardized detune frequency $\Delta_p$ of the probe field A is taken as a variable to see variation. The real component is between a negative real number and a positive real number, with one or more extreme values, and the imaginary component is between zero and a positive real number, with one or more extreme values. There is only one point where the real component is 1 and the imaginary component is 0. It is learned from FIG. 2A that the real component and the imaginary component both significantly vary in the interval between $-0.5\Gamma_3$ and $2\Gamma_3$.

Figure 2B:
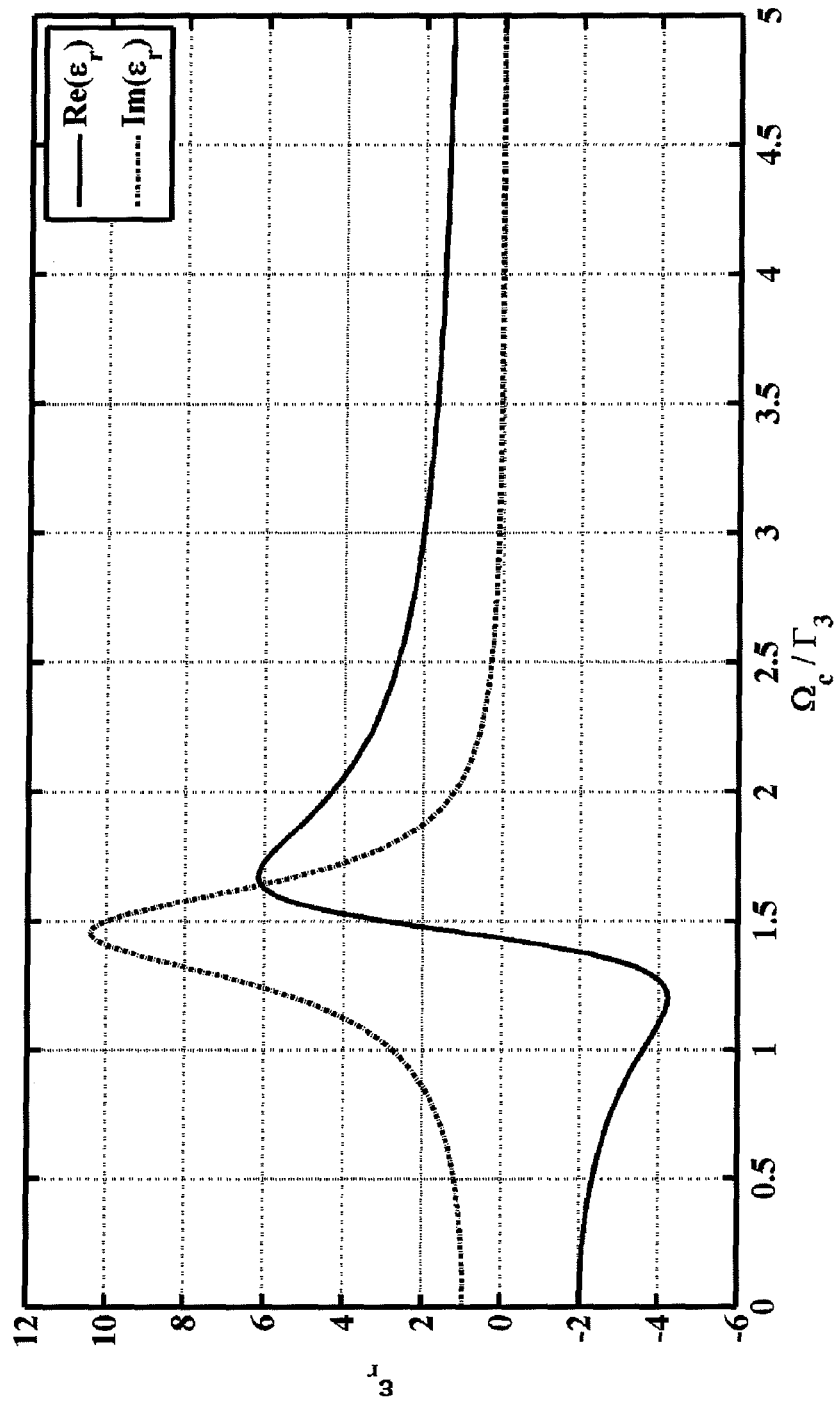
FIG. 2B is a graph of the electric permittivity of the preferred example of the present invention versus the Rabi frequency.

FIG. 2B is a graphic of the relative electric permittivity versus the Rabi frequency. The relative electric permittivity refers to the permittivity of the EIT-based stack layers 10 with limited layers relative to the electric permittivity of free space, and the standardized Rabi frequency $\Omega_c$ of the control field B is taken as a variable to see variation. The real component is between a negative real number and a positive real number, with two extreme values, and the imaginary component is between zero and a positive real number, with one maximum value. There is only one point where the real component is 1 and the imaginary component is 0. It is learned from FIG. 2B that the real component and the imaginary component both significantly vary in the interval between $-0.5\Gamma_3$ and $2\Gamma_3$.

Figure 3A:
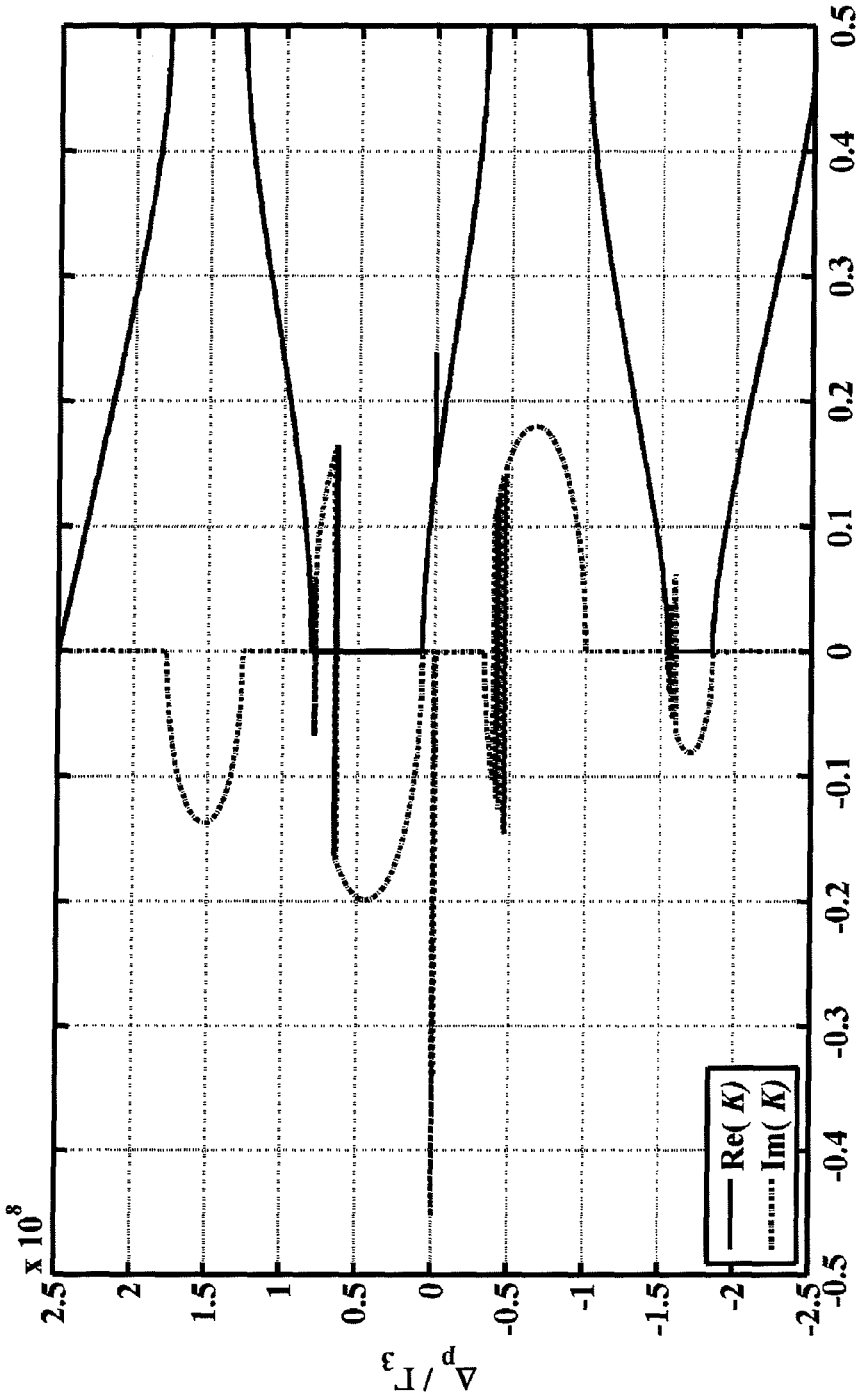
FIG. 3A is a graph of light-wave bands of limitless layers of the preferred example of the present invention.

FIG. 3A is a graph of light-wave bands of limitless layers. When the light-wave frequency on the vertical axis is $(1.3\sim1.8)\times10^8\times\Gamma_3$, the Bloch wave number is a pure imaginary number (at this time, light is blocked from passing through this area, which is referred to as a band gap). When the light-wave frequency on the vertical axis is $(1.8\sim2.5)\times10^8\times\Gamma_3$, the Bloch wave number is a pure real number (at this time, light is allowed to pass through this area, which is referred to as a band pass).

Figure 3B:
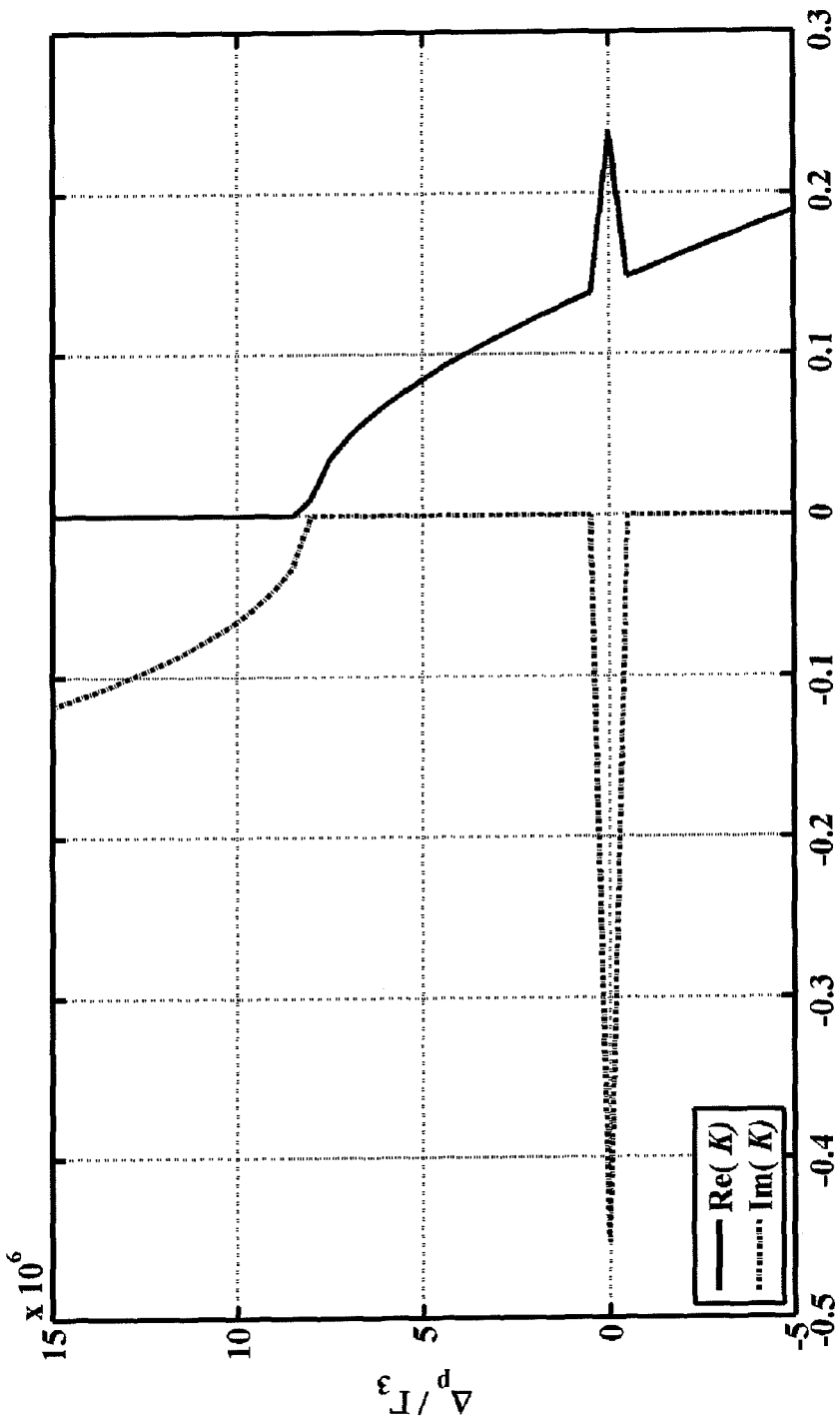
FIG. 3B is a partial graph of light-wave band gaps of the preferred example of the present invention.
Figure 4A:
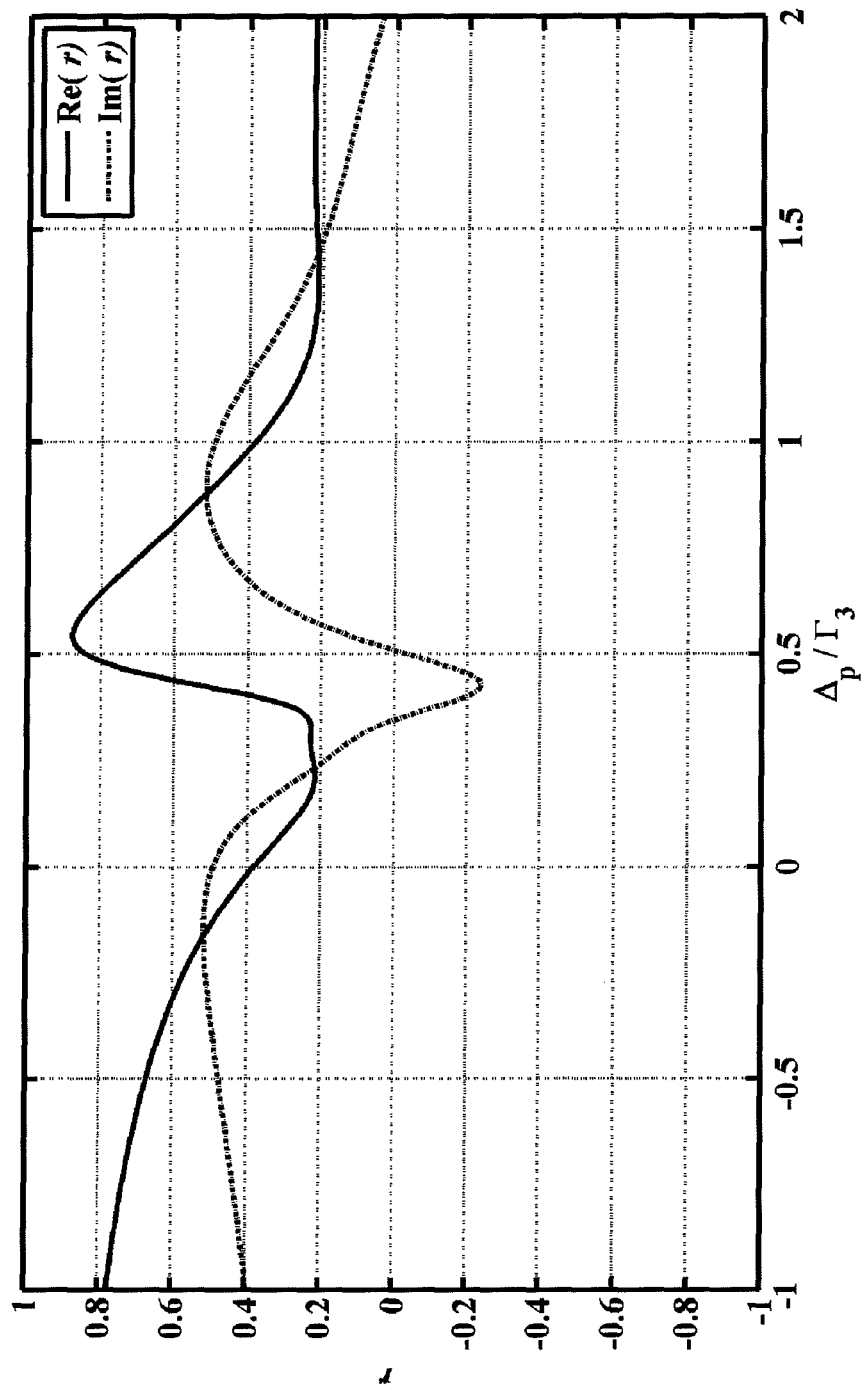
FIG. 4A is a graph of the reflection coefficient of a preferred example of the present invention with the number of layers as 1 versus the detune frequency of the probe field.
Figure 4B:
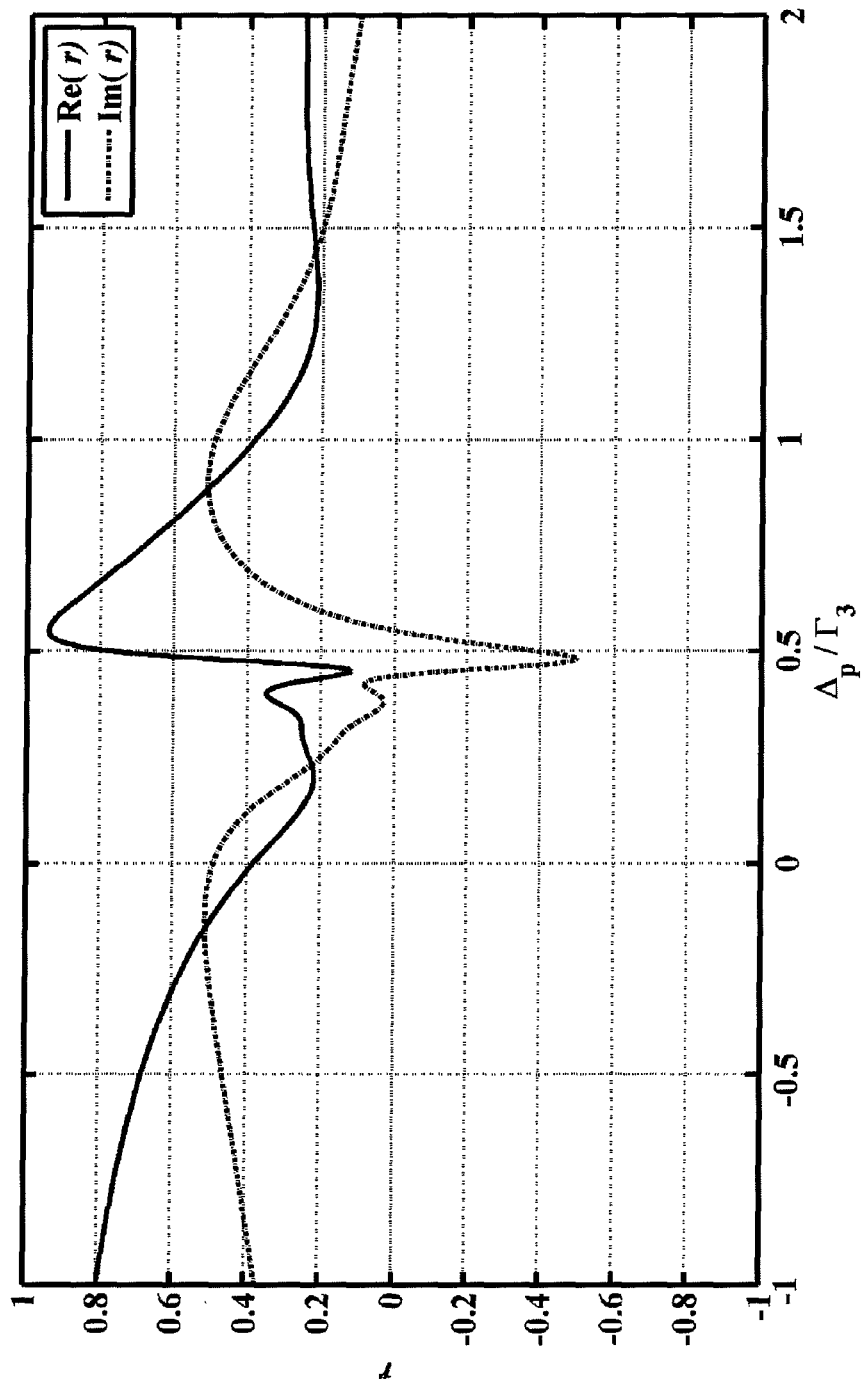
FIG. 4B is a graph of the reflection coefficient of a preferred example of the present invention with the number of layers as 2 versus the detune frequency of the probe field.
Figure 4C:
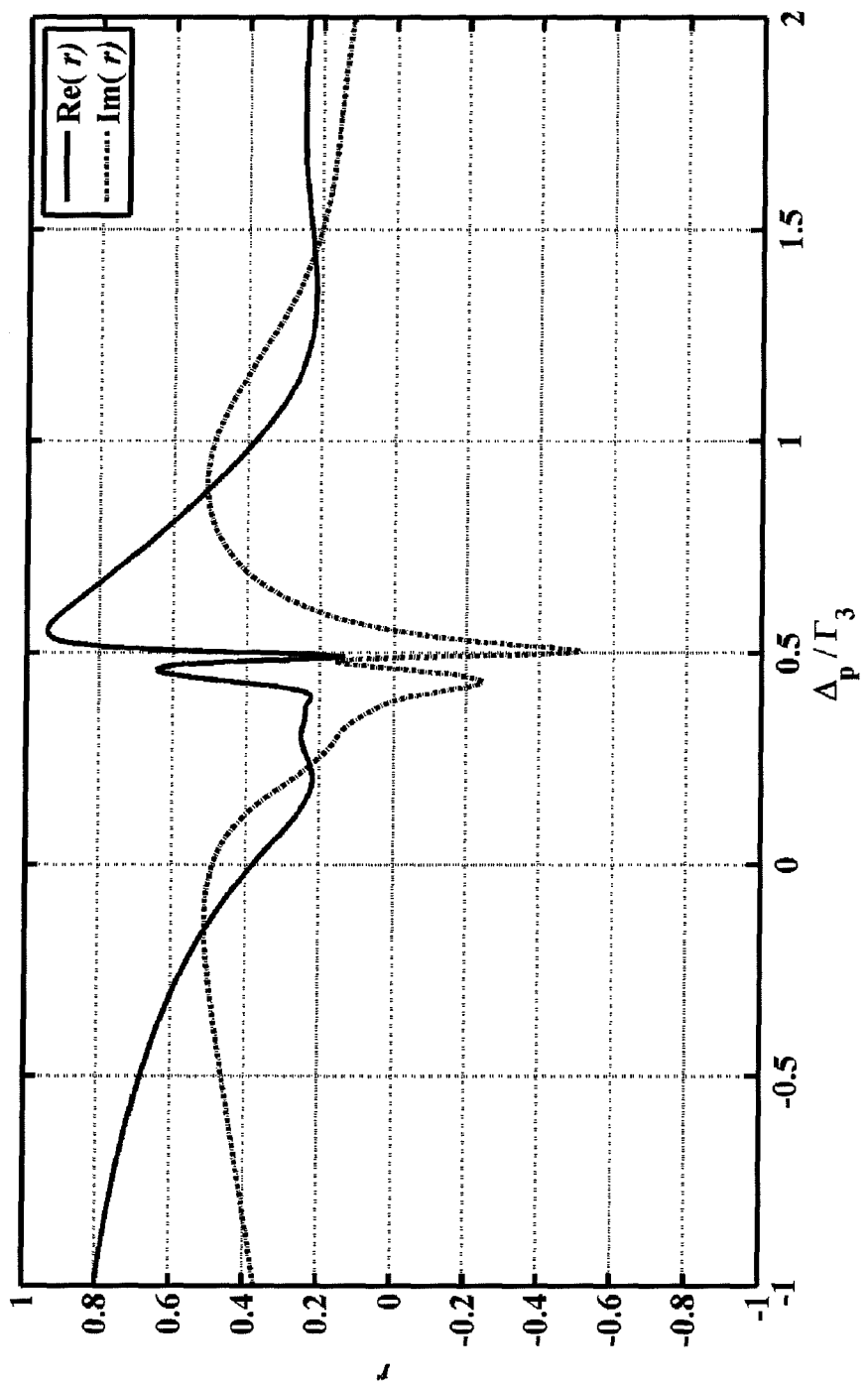
FIG. 4C is a graph of the reflection coefficient of a preferred example of the present invention with the number of layers as 3 versus the detune frequency of the probe field.
Figure 4D:
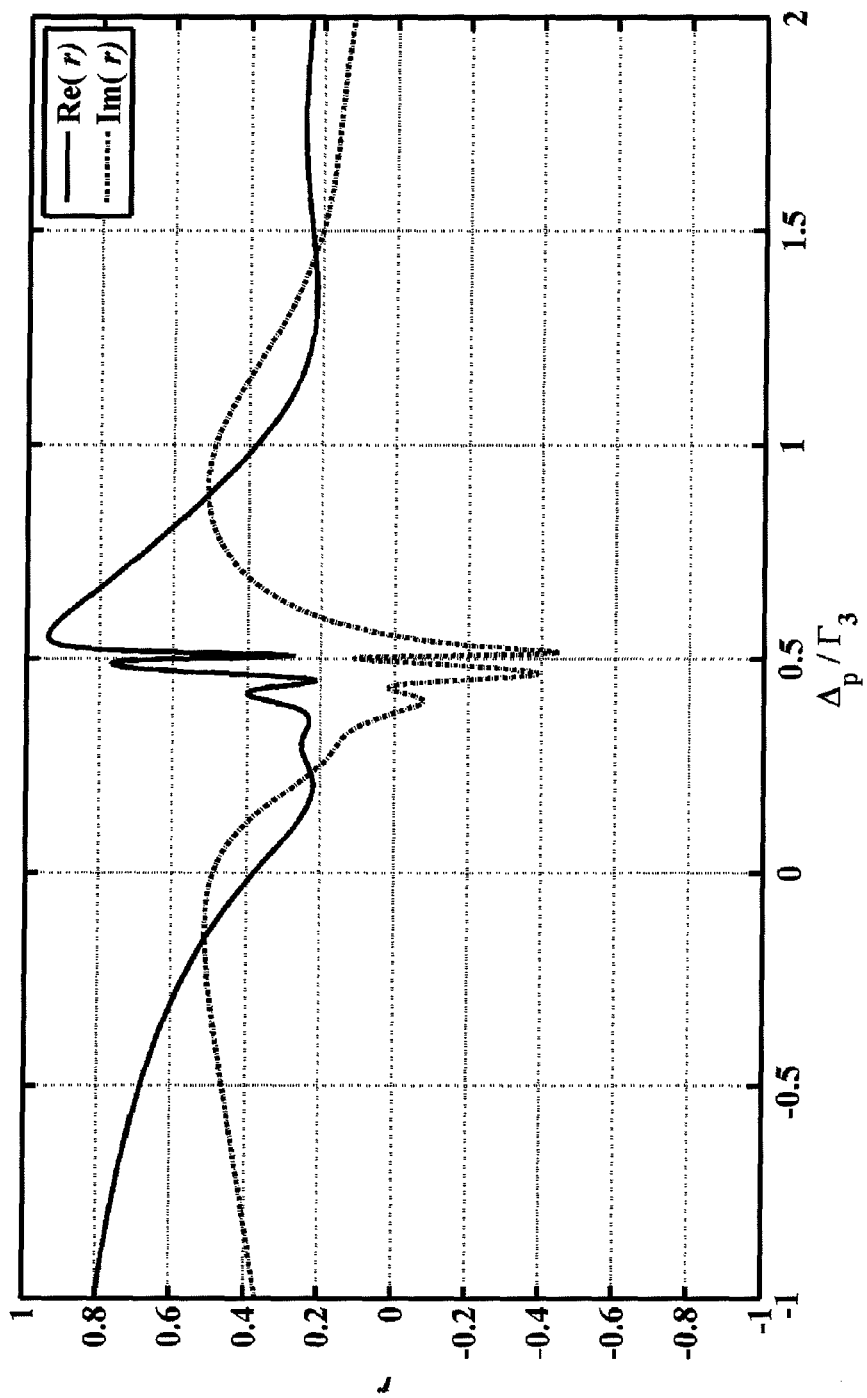
FIG. 4D is a graph of the reflection coefficient of a preferred example of the present invention with the number of layers as 4 versus the detune frequency of the probe field.
Figure 4E:
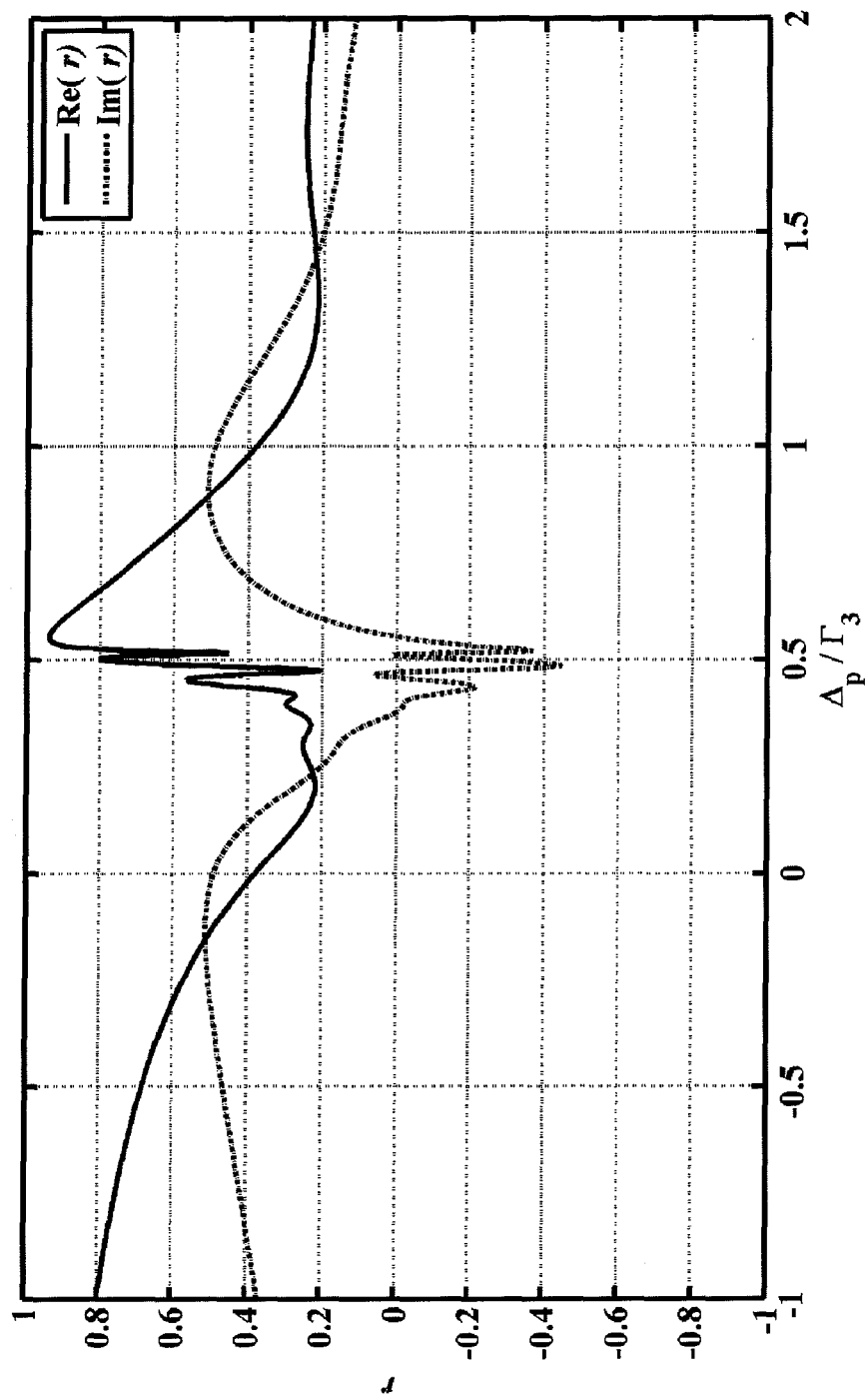
FIG. 4E is a graph of the reflection coefficient of a preferred example of the present invention with the number of layers as 5 versus the detune frequency of the probe field.
Figure 4F:
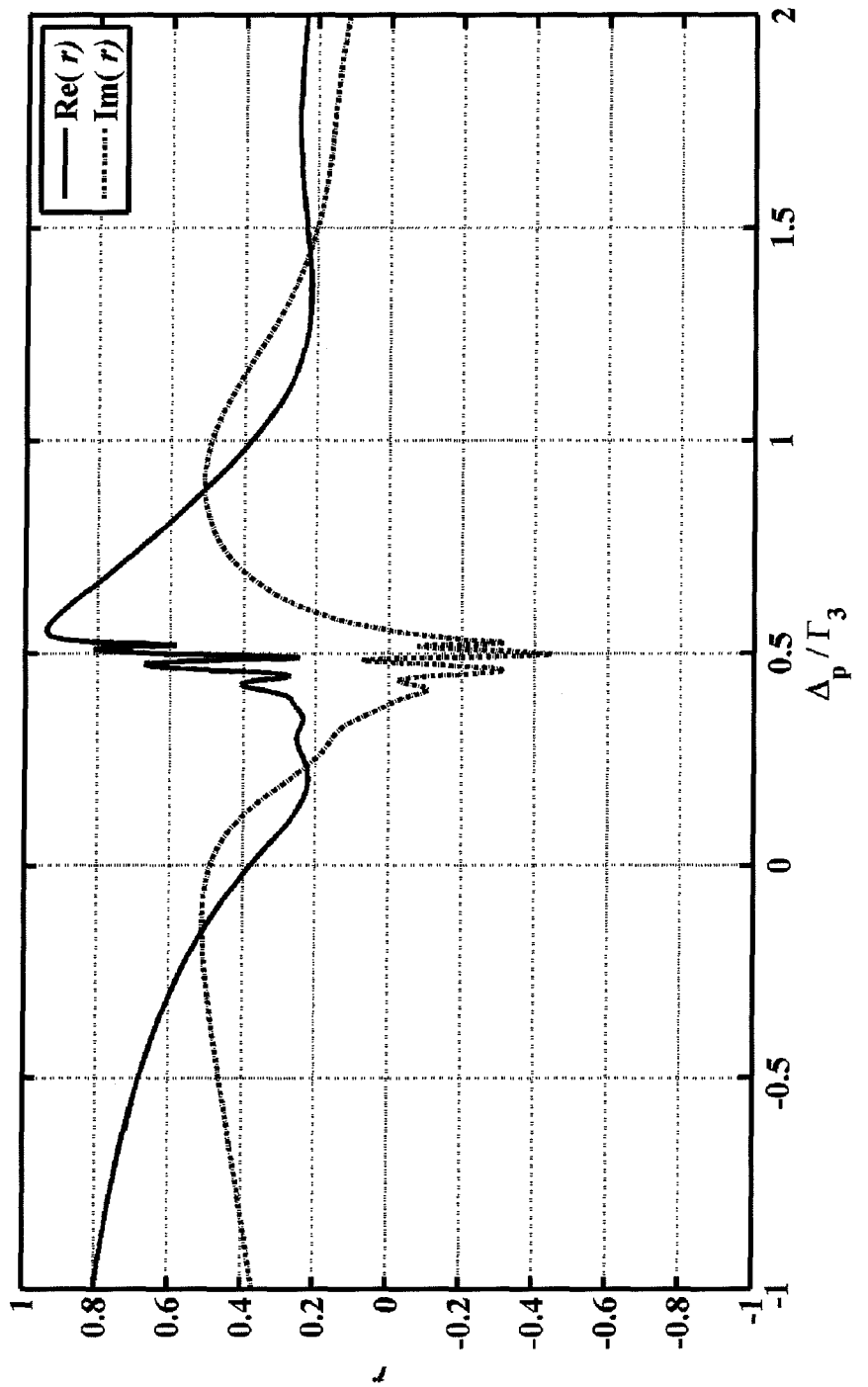
FIG. 4F is a graph of the reflection coefficient of a preferred example of the present invention with the number of layers as 6 versus the detune frequency of the probe field.

FIG. 3B is a partial graph of light-wave band gaps of the preferred example of the limitless layers. The EIT-based stack layers 10 with limitless layers, when taking the wave frequency of the probe field A as the variable, has one or more band-gap band-pass interlacing structures having the Bloch wave number as a complex number, representing a propagating mode wave decaying with the distance. The band-gap band-pass interlacing happens around $8.0\times10^6\sim8.5\times10^6$ on the vertical axis. For converting this into an actual frequency band, it has to be multiplied by the spontaneous emission decay rate $\Gamma_3=2\times10^7$, the frequency being $\omega_p=(8.0\times10^6\sim8.5\times10^6)\times(2\times10^7)=(1.6\times10^{14}\sim1.7\times10^{14}$ s$^{-1}$). At this time, the Bloch wave number on the corresponding horizontal axis may be a pure real number, a pure imaginary number or a complex number, expressed as K=Kr+(j×Ki). The band-pass structure is K=Kr+(j×0), where Kr is not zero, and Ki is zero. The band-gap structure is K=0+(j×Ki), where Kr is zero, and Ki is not zero. The band-gap band-pass interlacing structure is K=Kr+(j×Ki), where neither Kr nor Ki is zero. Referring to FIG. 3B, when the light-wave frequency on the vertical axis is $(8.0\sim8.5)\times10^6\times\Gamma_3$, the Bloch wave number is a complex number (at this time, the light passes while decaying with the distance, and here is known as the band-gap band-pass interlacing area). The above description demonstrates that the preferred embodiment is tuneable in terms of frequency bandwidth, wherein the frequency bandwidth may be the width of the band-gap structure, the width of the band-pass structure, or even the width of the band-gap band-pass interlacing structure.

Referring to FIGS. 4A, 4B, 4C, 4D, 4E and 4F together, graphics of the reflection coefficient versus the detune frequency of the probe field are given for the cases where the layer number N is 1, 2, 3, 4, 5 and 6, respectively. As to the reflection coefficient of the EIT-based stack layer(s) 10 having one or N layers, when the incident medium for the first binding interface 111 of the photonic crystal layer 11 is air, the penetrant medium of the second binding interface 122 of the EIT material layer 12 of the Nth EIT-based stack layer 10 is air. Given that the electric permittivity is $8.85\times10^{-12}$ F/m and the permeability is $4\pi\times10^7$ H/m, when the standardized detune frequency $\Delta_p$ of the probe field A is taken as a variable (with a varying range of $-1\sim2$), there are 2N+1 extreme values. The fact that the reflection coefficient significantly varies in the range of 0.2~0.8 on the horizontal axis suggests that the reflection coefficient significantly varies in the range of $(0.2\sim0.8)\times2\times10^7=0.4\times10^7\sim1.6\times10^7$ s$^{-1}$, namely in the range equal to $1/10^{10}$ of the light-wave frequency of ($10^{17}$ s$^{-1}$).

Referring to FIGS. 5A, 5B, 5C, 5D, 5E and 5F together, graphics of the reflectance and transmittance versus the detune frequency of the probe field are given for the cases where the layer number N is 1, 2, 3, 4, 5 and 6, respectively. As to the reflectance and transmittance of one or more (or N) EIT-based stack layers 10, when the incident medium of the first binding interface 111 of the photonic crystal layer 11 is air, the penetrant medium of the second binding interface 122 of the EIT material layer 12 is air. Given that the electric permittivity is $8.85 \times 10^{-12}$ F/m and the permeability is $4\pi \times 10^7$ H/m, when the standardized detune frequency $\Delta_p$ of the probe field A is taken as a variable (with a varying range of $-1 \sim 2$), there are 2N extreme values. As the reflectance is the squared absolute value of the reflection coefficient, it is similar to the reflection coefficient by having the significant variation confined in the range of 0.35~0.55 on the horizontal axis. This means the reflection coefficient significantly varies in the range of $(0.35 \sim 0.55) \times 2 \times 10^7 = 0.7 \times 10^7 \sim 1.1 \times 10^7$ s$^{-1}$, namely in the range equal to $1/10^{10}$ of the light-wave frequency of $(10^{17}$ s$^{-1})$.

Figure 5A:
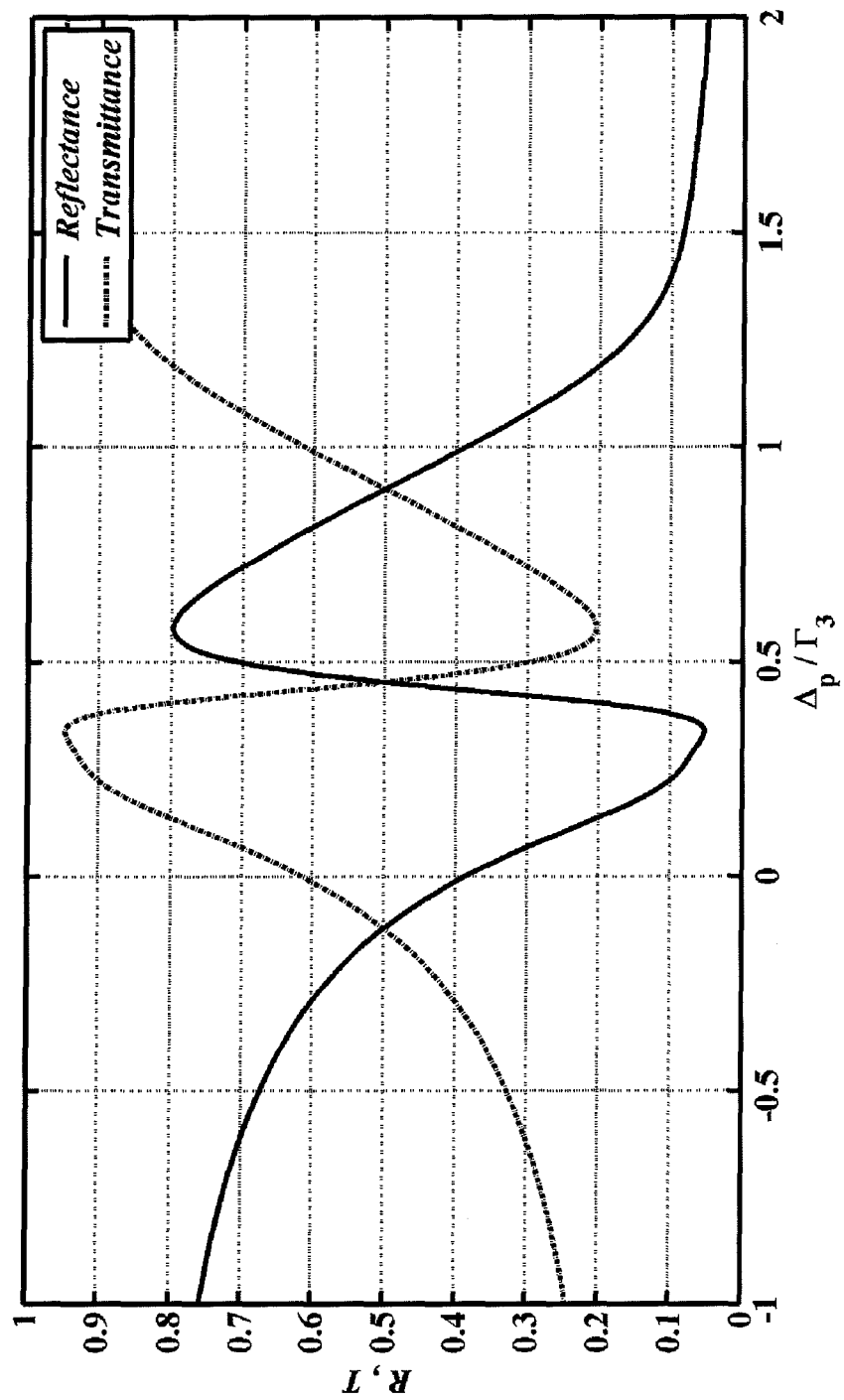
FIG. 5A is a graph of the reflectance and transmittance of the preferred example of FIG. 4A versus the detune frequency of the probe field.
Figure 5B:
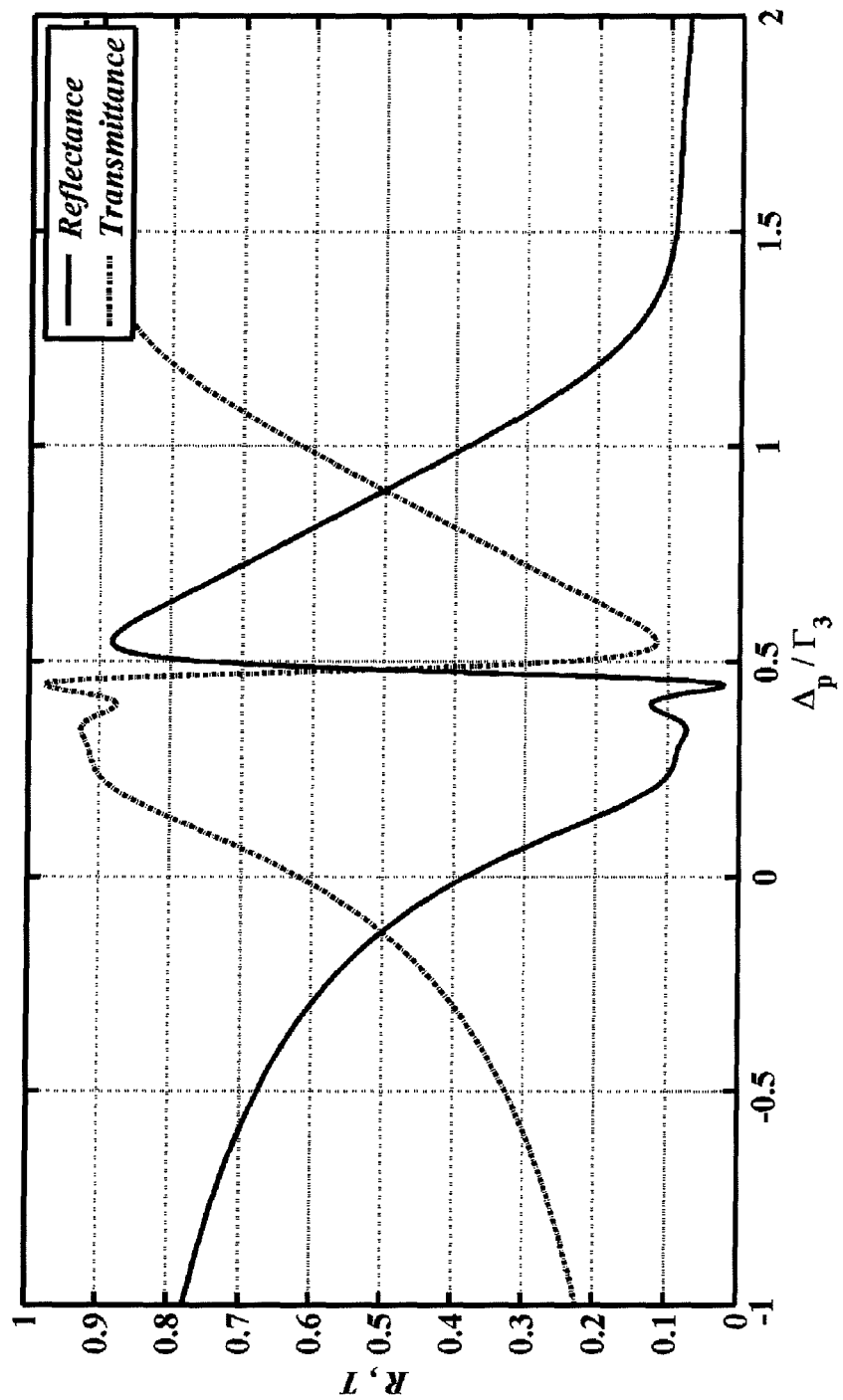
FIG. 5B is a graph of the reflectance and transmittance of the preferred example of FIG. 4B versus the detune frequency of the probe field.
Figure 5C:
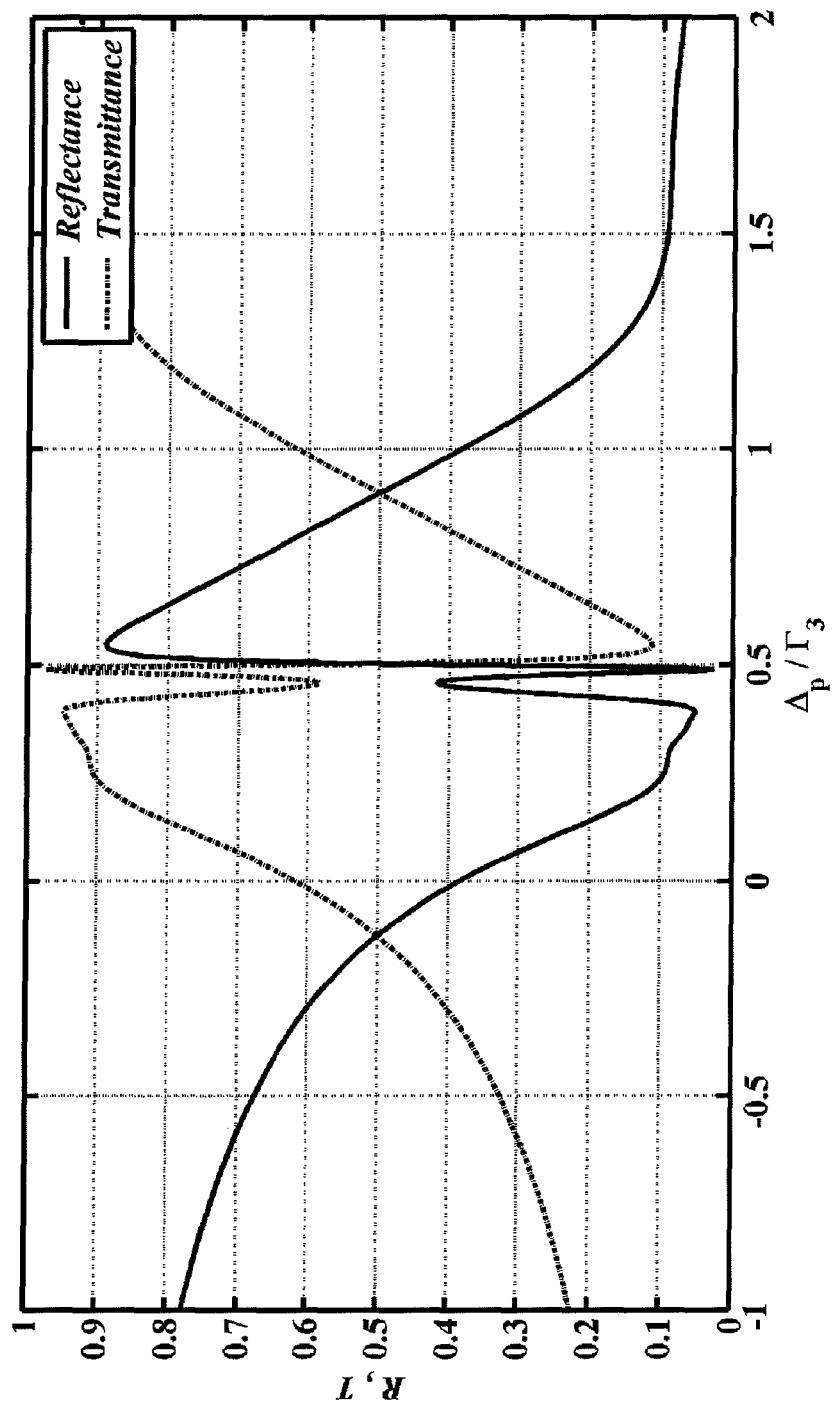
FIG. 5C is a graph of the reflectance and transmittance of the preferred example of FIG. 4C versus the detune frequency of the probe field.
Figure 5D:
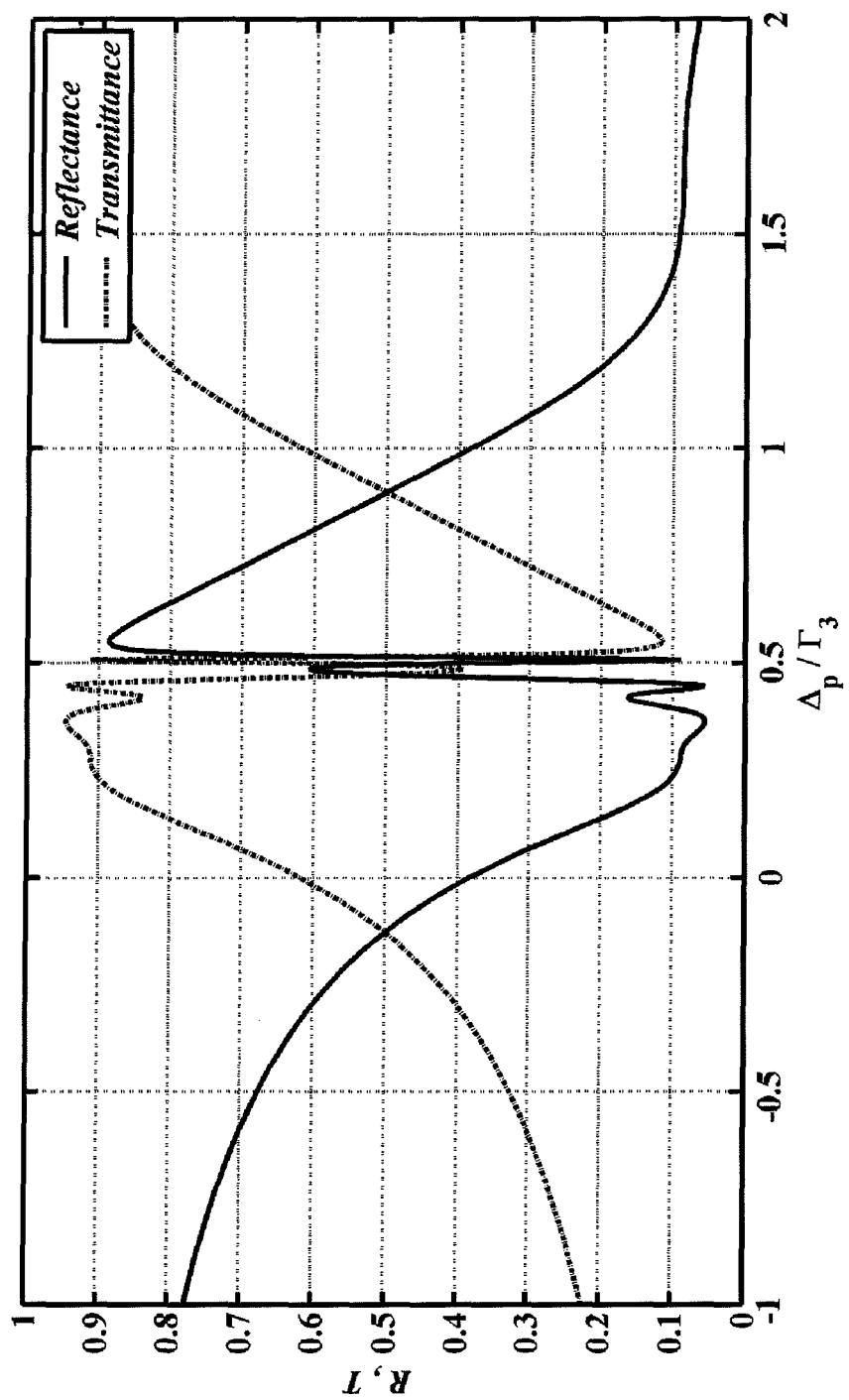
FIG. 5D is a graph of the reflectance and transmittance of the preferred example of FIG. 4D versus the detune frequency of the probe field.
Figure 5E:
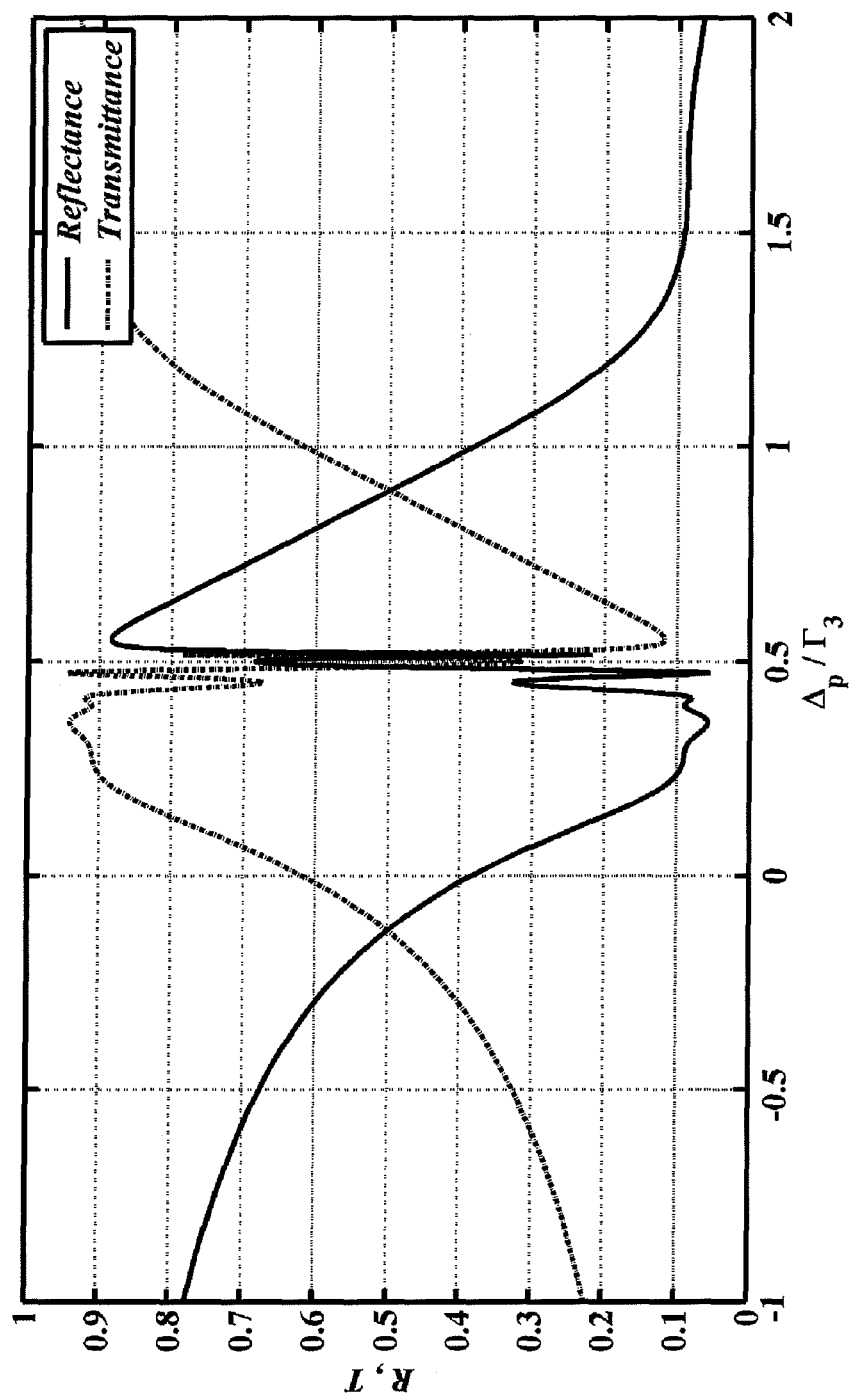
FIG. 5E is a graph of the reflectance and transmittance of the preferred example of FIG. 4E versus the detune frequency of the probe field.
Figure 5F:
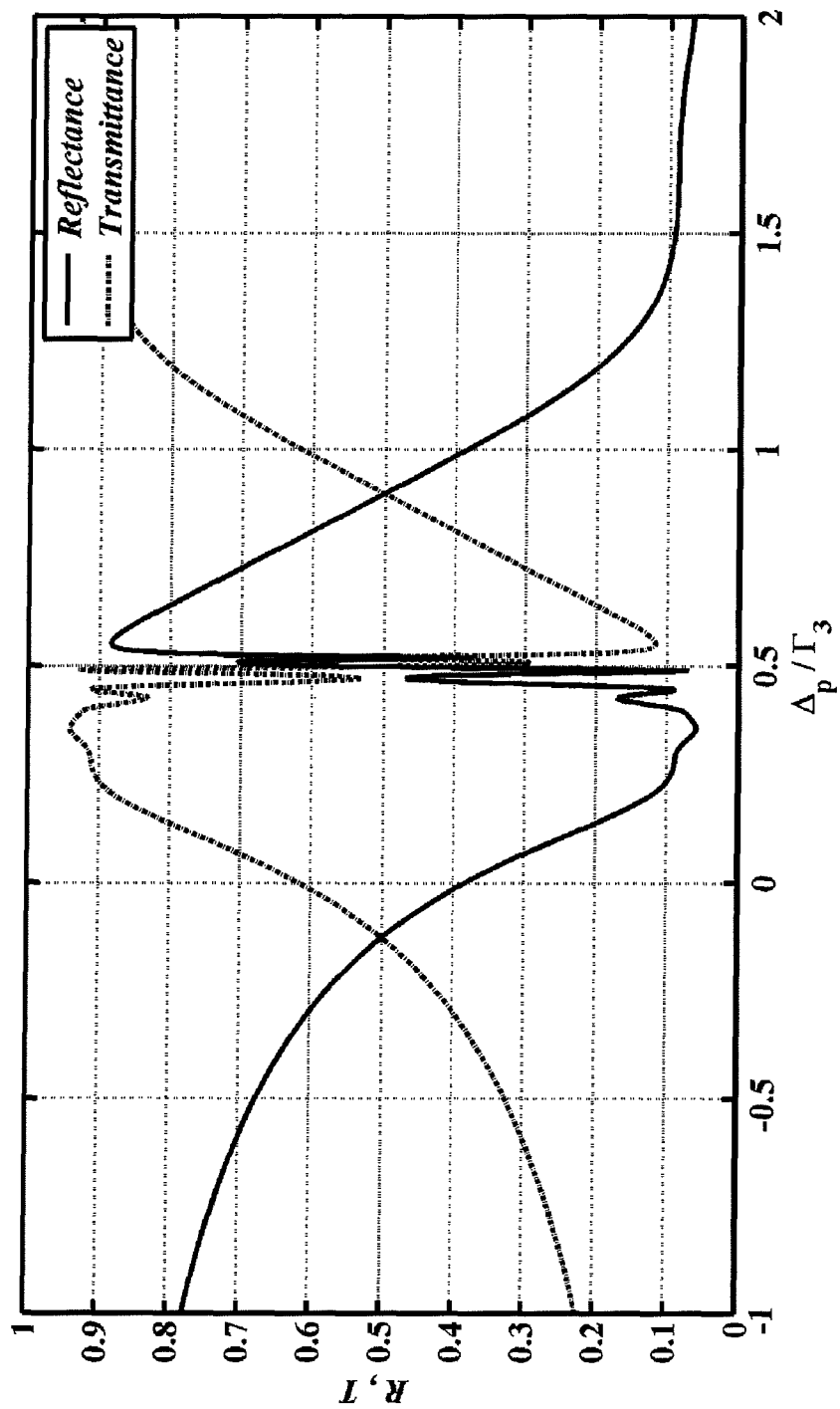
FIG. 5F is a graph of the reflectance and transmittance of the preferred example of FIG. 4F versus the detune frequency of the probe field.
Figure 5G:
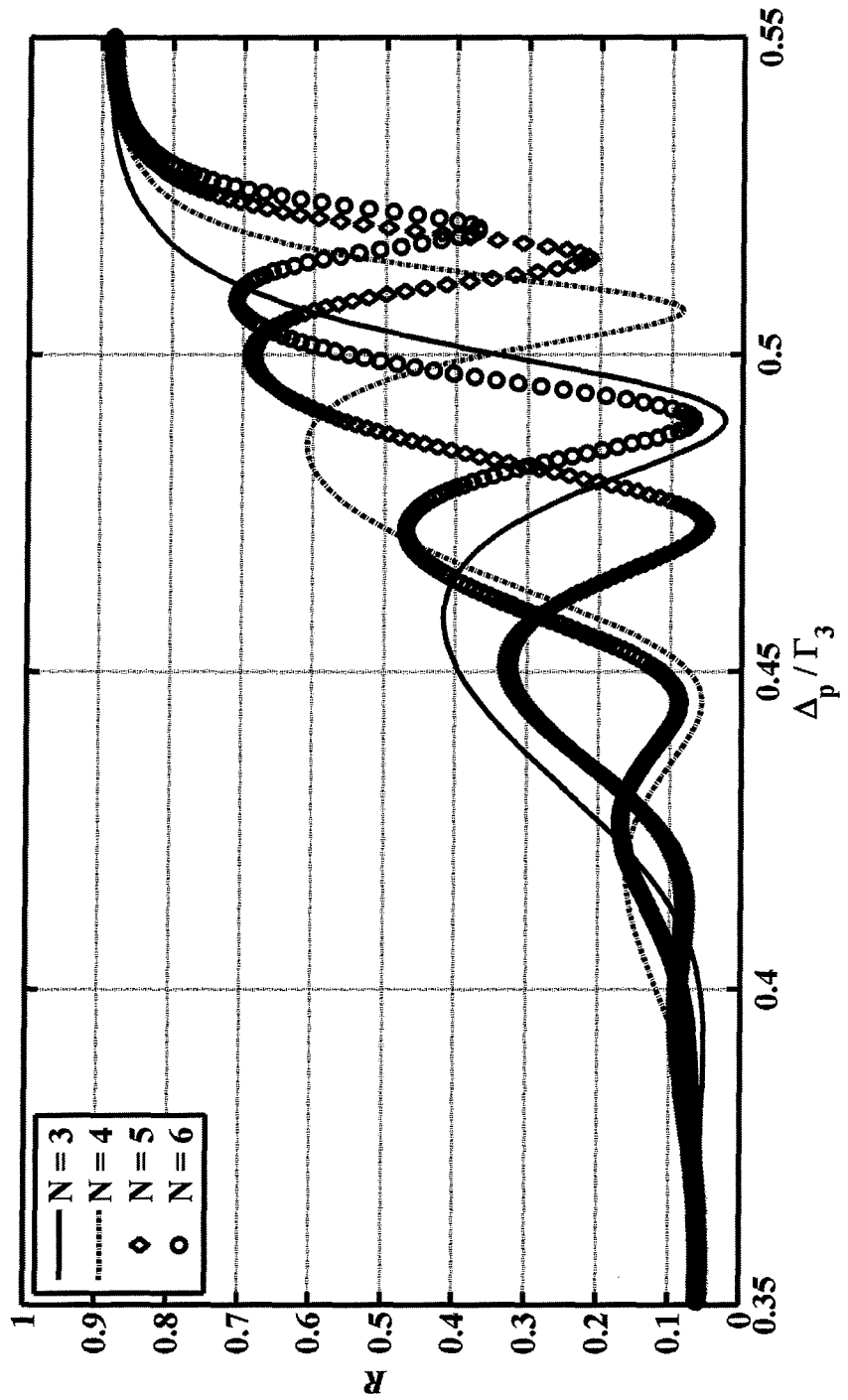
FIG. 5G is a graph of the reflectance and transmittance of the preferred examples of the present invention versus the detune frequency of the probe field.

Also refer to FIG. 5G for the graphic of the reflectance (reflectance=1–transmissivity) versus the detune frequency of the probe field when N is 3, 4, 5 and 6.

In the case where the layer number N is 4 (N=4), when the detune frequency $\Delta_p$ of the probe field A is $0.46\Gamma_3$, the transmissivity is at the minimum, and when the detune frequency $\Delta_p$ is $0.53\Gamma_3$, the transmissivity is at the maximum.

In the case where the layer number N is 6 (N=6), the fact is opposite. That is, when the detune frequency $\Delta_p$ of the probe field A is $0.46\Gamma_3$, the transmissivity is at the maximum, and when the detune frequency $\Delta_p$ is $0.53\Gamma_3$, the transmissivity is at the minimum.

The examples show that different numbers of layers cause significant change in terms of reflectance and transmissivity with the variation of the detune frequency $\Delta_p$ of the probe field A. Such significant change is useful for the design of photonic logic gates (such as OR gates and NAND gates). The truth table for OR gates and NAND gates is given below (Only when all inputs for an OR gate are logic 0 will the output be logic 0; only when all inputs for an NAND gate are logic 1 will the output be logic 0). The present preferred embodiment uses two beams of the probe field A having different frequencies. The present preferred embodiment determines the different usable frequencies according to the maximum of the transmissivity with respect to the detune frequency $\Delta_p$ of the probe field A:

| IN$_{A1}$ | IN$_{A2}$ | $Y = A_1 + A_2$ (4 OR Gates) | $Y = \overline{A_1 \cdot A_2}$ (6 NAND Gates) |
|---|---|---|---|
| 0 (0.46 $\Gamma_3$) | 0 (0.46 $\Gamma_3$) | 0 | 1 |
| 0 (0.46 $\Gamma_3$) | 1 (0.53 $\Gamma_3$) | 1 | 1 |
| 1 (0.53 $\Gamma_3$) | 0 (0.46 $\Gamma_3$) | 1 | 1 |
| 1 (0.53 $\Gamma_3$) | 1 (0.53 $\Gamma_3$) | 1 | 0 |

To sum up, by merely adjusting the photonic crystals and the photonic crystal layer 11 in thickness and the EIT material layer 12 in atom density and thickness, while controlling the probe field A and control field B, the EIT-based stack layers 10 can be changed in terms of band (including the band-pass width, the band-gap width, and the band-gap band-pass interlacing width), so as to use different levels of transmissivity to design all-optical devices such as optical switches, photonic crystals and photonic logic gate.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An electromagnetically induced transparent (EIT)-based photonic logic gate, comprising at least N electromagnetically induced transparent (EIT)-based stack layer(s) (10), and each said electromagnetically induced transparent (EIT)-based stack layer (10) including: a photonic crystal layer (11) being made of a material having a positive refractive index, a zero refractive index or a negative refractive index, and including a first binding interface (111) and a second binding interface (112); and an electromagnetically induced transparent (EIT) material layer (12) being made of hydrogen, lithium, sodium, rubidium or cesium, and having a first binding interface (121) and a second binding interface (122), wherein the second binding interface (112) of the photonic crystal layer (11) is bound to the first binding interface (121) of the electromagnetically induced transparent EIT) material layer (12); the electromagnetically induced transparent (EIT)-based stack layer (10) receiving a probe field (A) incident on the first binding interface (111) of the photonic crystal layer (11) as an input probe signal, and receiving a control field (B) incident on the electromagnetically induced transparent (EIT) material layer (12) as an enable signal, the probe field (A) passing through the second binding interface (112) of the photonic crystal layer (11), the first binding interface (121) and the second binding interface (122) of the electromagnetically induced transparent (EIT) material layer (12) successively and then acting as an output signal, and the control field (B) having a luminous intensity that is 10 to 200 times as much as a luminous intensity of the probe field (A).

2. The electromagnetically induced transparent (EIT)-based photonic logic gate of claim 1, wherein the electromagnetically induced transparent material layer (12) is a three-level atomically engineered material having a first energy level ($|1\rangle$), a second energy level ($|2\rangle$) and a third energy level ($|3\rangle$), in which the first energy level ($|1\rangle$) and the second energy level ($|2\rangle$) are both ground-state energy levels, while the third energy level ($|3\rangle$) is an excited-state energy level, and the third energy level ($|3\rangle$) has a radiative natural decay rate ($\Gamma_3$) while the second energy level ($|2\rangle$) has a different non-radiative decay rate ($\Gamma_2$).

3. The electromagnetically induced, transparent (EIT)-based photonic logic gate of claim 1, wherein the probe field (A) has a wavelength ranging between 380 nm and 800 nm, a luminous intensity ranging between 1 cd and 10 cd, and a detune frequency ($\Delta_p$) ranging between $-10^8$ s$^{-1}$ and $+10^8$ s$^{-1}$, while the control field (B) has a wavelength ranging between 380 nm and 800 nm, a luminous intensity ranging between 50 cd and 200 cd, and a de-phased rate ranging between $-10^5$ s$^{-1}$ and $+10^5$ s$^{-1}$.

4. The electromagnetically induced transparent (EIT)-based photonic logic gate of claim 1, wherein the electromagnetically induced transparency (EIT)-based stack layer (10) have an atomic number density ranging between $10^9$ m$^{-3}$ and $10^{23}$ m$^{-3}$.

5. The electromagnetically induced transparent (EIT)-based photonic logic gate of claim 1, wherein the electromagnetically induced transparent (EIT)-based stack layer (10) has an electrical dipole moment ranging between $10^{-28}$ C.m and $10^{-30}$ C.m.

6. The electromagnetically induced transparency (EIT)-based photonic logic gate of claim 1, wherein the electromagnetically induced transparent (EIT)-based stack layer (10) has a spontaneous emission decay rate ($\Gamma_3$) ranging between $0.1 \times 10^7$ s$^{-1}$ and $5 \times 10^7$ s$^{-1}$.

7. The electromagnetically induced transparent (EIT)-based photonic logic gate of claim 1, wherein the electromagnetically induced transparent (EIT)-based stack layer (10) has a de-phased rate ranging between $-10^5$ s$^{-1}$ and $+10^5$ s$^{-1}$.

8. The electromagnetically induced transparent (EIT)-based photonic logic gate of claim 1, wherein the electromagnetically induced transparent (EIT)-based stack layer (10) has a Rabi frequency ($\Omega c$) ranging between $0.5 \times 10^7$ s$^{-1}$ and $5 \times 10^7$ s$^{-1}$.

9. The electromagnetically induced transparent (EIT)-based photonic logic gate of claim 1, wherein the electromagnetically induced transparent (EIT)-based stack layers (10) are periodically arranged and are plural layers.

* * * * *